3,640,971
Patented Feb. 8, 1972

3,640,971
END-BLOCKED COPOLYMERS OF VINYL MONOMERS WITH CYCLIC MONOMERS AND METHOD FOR PREPARING THE SAME
Shitomi Katayama and Hideichi Horikawa, Akita, Japan, assignors to Denki Onkyo Co. Ltd., Tokyo, Japan
No Drawing. Filed Apr. 17, 1969, Ser. No. 817,162
Claims priority, application Japan, June 4, 1968, 43/38,169
Int. Cl. C08f 27/08, 27/00
U.S. Cl. 260—78.3 R       13 Claims

ABSTRACT OF THE DISCLOSURE

End-blocked copolymers consisting of molecular chains of vinyl polymers connected at least at one chain terminal to the chain terminal of a ring-opened unit of two or more of the cyclic compounds of the group of $\beta$-lactones, $\epsilon$-caprolactone and ethylene oxide, the connection between the vinyl chain and the chain of the cyclic compound being by way of amide or nitrogen. The invention also comprises a method for making the end-blocked copolymers in a three-step process, wherein the first step consists of polymerization of a vinyl-type monomer in the presence of a halogen compound yielding a polymer having a halogen at one or both chain ends, which is converted in a second step into an $\omega$-aminopolymer by reaction with ammonia or an amide, and wherein the addition of one or more cyclic compounds of the group comprising a $\beta$-lactone, $\epsilon$-caprolactone, and ethylene oxide is effected in a third step.

SUMMARY OF THE INVENTION

The present invention relates to end-blocked copolymers of vinyl monomers with ring-opened cyclic monomers, more particularly the group of monomers consisting of $\beta$-lactones, $\epsilon$-caprolactone, and ethylene oxide. The invention also relates to a method of preparing the end-blocked copolymers.

Synthetic polymers which are commercially available and used as fibers, rubbers, plastics, films, adhesives, paints, etc. have two shortcomings in their properties. The one is that they are in many cases easily charged with static electricity, which causes many troubles during use. The other is that in many cases they have poor dyeability.

To improve these shortcomings, various methods have been tried, e.g. graft polymerization, blending of different polymers, and spinning of mixed fibers of several kinds. Graft polymers, however, have in many cases inferior quality compared to the original polymers, due to lower melting points and decrease in crystallinity. In the case when different kinds of polymers are blended, each component sometimes causes phase separation and separates out from the blended polymer texture after some time has elapsed. Spinning of mixed fibers of different kinds can be applied only for textiles.

It is an object of the present invention to provide synthetic polymers of improved properties and a process of preparing the same.

More particularly it is an object to prepare synthetic copolymers in which the tendency to develop electric charge is less pronounced and which exhibit higher dyeability than polymers hitherto in use.

It is yet another object to prevent the lowering in the melting point of the polymers and their decrease in crystallinity.

Other objects and advantages of the present invention will become apparent from the following detailed description. According to the present invention the method for preparing the end-blocked copolymers consists in the following three steps:

(1) in the polymerization of a vinyl-type monomer in the presence of a halogen compound, such as a polyhalogen alkyl, to obtain an $\omega$-halogen polymer, i.e. a polymer having a halogen atom at one end of the molecular chain or at both chain ends. The halogens of this type are also called "telogens" and a number of examples of the same will be given below.

(2) is the conversion of the $\omega$-halogen polymer by ammonolysis or aminolysis, at either one or both of the terminals of the polymer molecular chain, into $\omega$-aminopolymer, which may be a primary, a secondary or a tertiary aminoalkylpolymer.

(3) is the addition of one or more than one of the group of cyclic monomers, consisting of $\beta$-lactones, $\epsilon$-caprolactone, and ethylene oxide, to the $\omega$-aminopolymer.

As vinyl monomers those are used which can be polymerized into $\omega$-halopolymers in the presence of some halogen compounds, or telogen e.g., styrene, acrylonitrile, methacrylonitrile, butadiene, isoprene, ethylene, propylene, methyl acrylate, methyl methacrylate, acrylamide, methacrylamide, vinyl acetate, vinyl toluene, etc.

The process steps are described in further detail below.

The halogen compounds called "telogens" in telomerizations, are those which can add a halogen atom or radical either to one or to both of the terminals of the polymer chains, as shown,

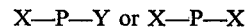

where X is a halogen atom, P is the polymer chain and Y is another kind of terminal viz a halogen radical.

Examples of telogens are: haloalkanes like $CCl_4$, $CBr_4$, $Cl_3CCCl_3$, $CCl_2Br_2$, $CF_2Br_2$, $CF_3I$; haloalkenes like $Cl_2C=CCl_2$, $CHCl=CCl_2$; acyl halides like $CH_3COCl$, $COCl_2$, $ClCH_2COCl$; haloalcohols like $Cl_3CCH_2OH$, $BrCH_2CH_2OH$; haloethers like $ClCH_2OCH_3$,

sulfonyl halides like $C_6H_5SO_2Cl$, $Cl_3CSO_2Cl$; haloaldehydes like $Cl_3CHO$, $ClCH_2CH_2CHO$. Chlorine and bromine compounds are preferred rather than fluorine and iodine compounds.

A proper amount of a suitable kind of telogen should be added to the polymerization system, either by itself or in some solvent. To obtain an $\omega$-halopolymer of high degree of polymerization, a telogen having a small chain transfer constant may be applied diluted with some solvent, while to obtain an $\omega$-halopolymer of low degree of polymerization, a telogen having a high chain transfer constant may be used. The chain transfer constants increase usually in the order, $Cl<Br<I$.

In the second step either the ammonolysis or aminolysis of $\omega$-halopolymers into $\omega$-aminopolymers is performed. In the case of ammonolysis, there are two main methods. The one is to treat the $\omega$-halopolymer in ammonia-ethanol mixture at about 100° C. in a sealed reaction vessel. The other method is to treat the $\omega$-halopolymer with liquid ammonia. In both cases it is preferred to use an excess amount of ammonia and to agitate the reactants. The longer the time of the reaction is, the more the ammonolysis proceeds, but 20–50 hrs. are usually quite sufficient. The second method is preferred, because it can be performed at lower temperatures with few side reactions. The reaction temperature in the second method may be from −40 to 100° C., and 0–60° C. is especially preferred. The reaction usually proceeds at a fairly high rate, for example, some reactions can be completed within 15 min. at 0° C. The rate of the ammonolysis depends mainly on the particular halogen at the terminal of the molecular chain, and it is usually proceeding in the order of $I>Br>Cl$.

Organic primary or secondary amines, like methylamine, ethylamine, propylamine, dimethylamine, methylethylamine, diethylamine, etc., can be used for aminolysis. The reaction temperatures should not reach those at which decompositions of polymers would occur.

The resulting ω-aminopolymer can be illustrated by the following formulas:

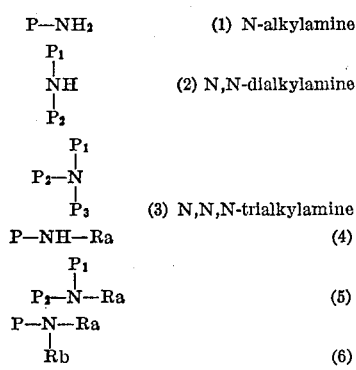

The excess amount of ammonia gives a larger quantity of (1) than of (2) and (3). When it is desired to keep the properties of the original polymer unchanged, it is preferred to use an excess amount of ammonia.

In the above formulas, P, $P_1$, $P_2$ and $P_3$ are vinyl and related polymer molecular chains, as listed above, and Ra and Rb are alkyl, aryl, and related groups that constitute the primary and secondary amines. Examples of Ra and Rb are, methyl, ethyl, propyl, butyl, phenyl, naphthyl groups; also amines like piperazine, piperidine, pyrrole, etc. are included in these categories. Ra may be the same as Rb, e.g., in dimethylamine, or may be different as, e.g., in methylethylamine.

In the third step, one or several of the cyclic monomers of the group consisting of β-lactones, ε-caprolactone and ethylene oxide are reacted with the ω-aminopolymer. It should be noted, however, that many β-lactones and in some cases ε-caprolactone can react with the ω-aminopolymer of the Formulas 3, 5 and 6, but ethylene oxide cannot. With the ω-aminopolymers of the Formulas 1, 2 and 4 any of the β-lactones, ε-caprolactone and ethylene oxide can react in most cases.

The resulting copolymers are illustrated below.

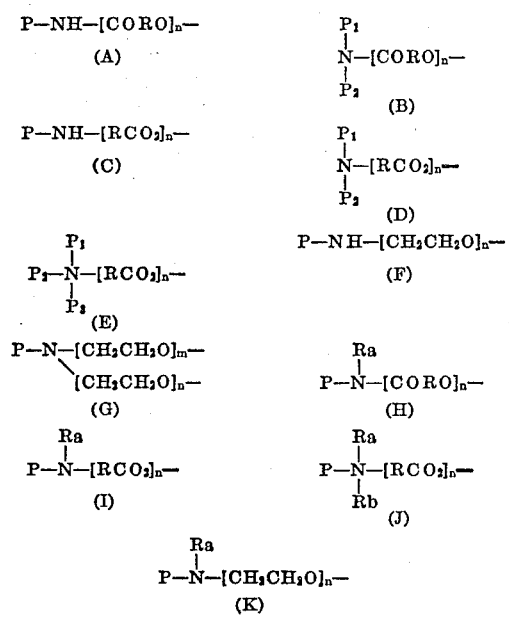

(L) End-blocked copolymers which consist of vinyl polymer chains connected with the copolyester, or/and polyesterether at the polymer chain terminals.

In this case more than two of the cyclic monomers β-lactones, ε-caprolactone and ethylene oxide are used as the starting materials. So the heteropolymer units may be, e.g., like

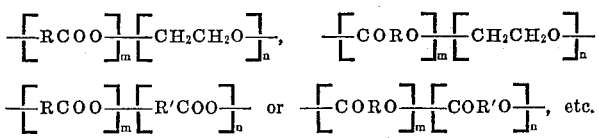

For example, the structure may be, e.g., like

wherein R and R' are different radicals of the previously mentioned lactones.

In the formulas P, $P_1$ and $P_2$ are vinyl and related polymer molecular chains, R is a radical of the lactones in

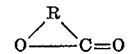

Ra and Rb are radicals forming part of organic primary and secondary amines like Ra—$NH_2$ and Ra—NH—Rb, as explained above.

The β-lactone has the structure,

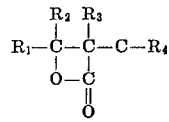

wherein $R_1$, $R_2$, $R_3$ and $R_4$ are hydrogen, alkyl, allyl, aryl and aralkyl groups e.g. β-propiolactone, β-butyrolactone, β-isovalerolactone, β-caprolactone, β-isocaprolactone, β-methyl-β-valerolactone, α,α-dipropylpropionolactone, α,α-dibutylpropionolocatone, α,α-diethylpropionolactone, α-phenylpropionolactone, α-phenyl-α-ethyl-β - propionolactone, α-methyl-β-ethyl-β-propionolactone, and α-bis(chloromethyl)propiolactone. At least one of $R_1$, $R_2$, $R_3$ and $R_4$ should be a hydrogen atom. With the number of hydrogen atoms for $R_1$, $R_2$, $R_3$ and $R_4$, the polymerizability of the β-lactone increases, therefore lactones like β-propiolactone and β-butyrolactone are preferred.

It should be understood that the structures of polymers illustrated by the Formulas A to K are given in a simplified manner. For instance, in the structure (A), the more detailed structure is, P—NH—$[CORO]_n$H or

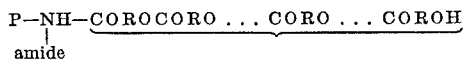

$n$—degree of polymerization, wherein $n \geq 1$.

In the structure (C),

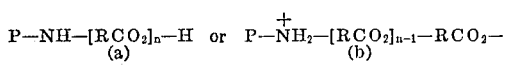

is the more precise expression.

But the structures (a) and (b) are in a certain equilibrium depending upon the circumstance where the polymer is kept or in what manner it is treated. Therefore the general expression was given, namely,

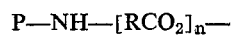

The structures (C), (D), (E), (I), and (J) belong to this category, only (E) and (J) are somewhat different from (C), (D) and (I) because they only come in betain structure.

The strurtures (A), (B) and (H) belong to the (A) group, thus, e.g. (B) can be written

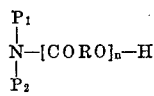

the chain terminal being "hydroxy terminated."

The exact expressions of the structures are as follows:

(A) general structure, P—NH—[CORO]$_n$—
 more precisely, P—NH—[CORO]$_n$—H (B) general structure,
$$\begin{array}{c} P_1 \\ | \\ N\text{—[CORO]}_n\text{—} \\ | \\ P_2 \end{array}$$

more precisely,
$$\begin{array}{c} P_1 \\ | \\ N\text{—[CORO]}_n\text{—H} \\ | \\ P_2 \end{array}$$

(C) general structure, P—NH—[RCO$_2$]$_n$—

The real structure is in the equilibrium state of the two structures

P—NH—[RCO$_2$]$_n$—H and P—NH$_2$—[RCO$_2$]$_{n-1}$—RCO$_2^-$
non-dissociated structure    betain structure (D) general structure,
$$\begin{array}{c} P_1 \\ | \\ N\text{—[RCO}_2]_n\text{—} \\ | \\ P_2 \end{array}$$

real structure,
$$\begin{array}{c} P_1 \\ | \\ N\text{—[RCO}_2]_n\text{—H} \\ | \\ P_2 \end{array} \rightleftharpoons \begin{array}{c} P_1 \\ |+ \\ NH\text{—[RCO}_2]_{n-1}\text{—RCO}_2^- \\ | \\ P_2 \end{array}$$

(E) general structure,
$$\begin{array}{c} P_1 \\ | \\ P_2\text{—N—[RCO}_2]_n\text{—} \\ | \\ P_3 \end{array}$$

real structure,
$$\begin{array}{c} P_1 \\ |+ \\ P_2\text{—N—[RCO}_2]_{n-1}\text{—RCO}_2^- \\ | \\ P_3 \end{array}$$

As mentioned above in this case (E) and also in (J), where a tertiary amine terminal is connected to the chain terminal of the polymer of cyclic lactones by way of a nitrogen linkage, there is no non-dissociated structure, but only the betain structure.

(F) general structure, P—NH—[CH$_2$CH$_2$O]$_n$—
 more precisely, P—NH—[CH$_2$CH$_2$O]$_n$—H (G) general structure,
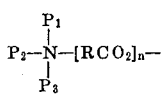

more precisely,
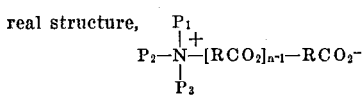

(H) general structure,
$$\begin{array}{c} Ra \\ | \\ P\text{—N—[CORO]}_n\text{—} \end{array}$$

more precisely,
$$\begin{array}{c} Ra \\ | \\ P\text{—N—[CORO]}_n\text{—H} \end{array}$$

(I) general structure,
$$\begin{array}{c} Ra \\ | \\ P\text{—N—[RCO}_2]_n\text{—} \end{array}$$

real structure,
$$\begin{array}{cc} Ra & Ra \\ | & |+ \\ P\text{—N—[RCO}_2]_n\text{—H} \rightleftharpoons & P\text{—NH—[RCO}_2]_{n-1}\text{—RCO}_2^- \end{array}$$

(J) general structure,
$$\begin{array}{c} Ra \\ | \\ P\text{—N—[RCO}_2]_n\text{—} \\ | \\ Rb \end{array}$$

real structure,
$$\begin{array}{c} Ra \\ |+ \\ P\text{—N—[RCO}_2]_{n-1}\text{—RCO}_2^- \\ | \\ Rb \end{array}$$

(K) general structure,
$$\begin{array}{c} Ra \\ | \\ P\text{—N—[CH}_2\text{CH}_2\text{O]}_n\text{—} \end{array}$$

more precise,
$$\begin{array}{c} Ra \\ | \\ P\text{—N—[CH}_2\text{CH}_2\text{O]}_n\text{—H} \end{array}$$

In summing up the above, we may state that the (A), (B), (H) group is a hydroxy terminated non-dissociated structure, having polyester units; the (C), (D), (I) group has two structures each of which is in equilibrium with the other. The one structure is a carboxy-terminated non-dissociated structure and the other is a carboxylate-ion terminated betain structure, with a proton migrated onto the amino nitrogen atom. The (E), (J) group has only betain structure with a quaternary nitrogen atom, as in ammonium salts. The (F), (G), (K) group is hydroxy terminated, with a polyether (polyethyleneoxide) chain.

The reaction of the cyclic monomer with the ω-aminopolymer may be performed with or without a solvent. It is preferred that the solvent dissolves the cyclic monomer, but it is not always necessary for the solvent to dissolve the ω-aminopolymer. It is also desired that the solvent should not react with the cyclic monomer, or if so, only slightly.

Examples of solvents are: chloroform, γ-butyrolactone, carbon tetrachloride, ethers, tetrahydrofuran, acetonitrile, aliphatic and aromatic hydrocarbons, water, alcohols, N-methylpyrrolidone, N,N - dimethylformamide, N,N - dimethylacetamide, and dimethylsulfoxide.

Water and alcohols are not so suitable, since they react with the cyclic monomers, though not so strongly as with the amines. Solvents like N,N-dimethylformamide, N,N-dimethylacetamide and dimethylsulfoxide sometimes give homopolymers of cyclic monomers, though these solvents increase the rate of the addition reaction of the cyclic monomer to the ω-aminopolymer.

The reaction temperature may be from below about 160° C. down to the freezing point of the cyclic monomer. As for β-lactones, −20–80° C. is preferred and for ε-caprolactone and ethylene oxide 0–120° C. is preferred. The reaction may be performed in air at the temperatures (e.g., below 50° C. at which no oxidation reaction takes place, but it is preferred to perform the reaction in vacuo or in an inactive atmosphere such as nitrogen, helium, neon and argon (but not carbon dioxide or carbon oxide). Moisture and carbon dioxide should be excluded from the reaction system as much as possible.

The reaction may reach equilibrium state within 200 hrs. even at low temperatures, and usually 50 hrs. are quite sufficient for the copolymerization.

When the reaction system is heterogeneous, it is better to use the ω-aminopolymer in the form of a fine powder or small fiber. Agitation or stirring of the reaction system is not always necessary.

If the resulting polymer is a solution, it may be directly applied for wet or dry forming processes like spinning, or may be precipitated by some non-solvent. If the copolymer is solid, it may be washed with some solvent which dissolves the unreacted cyclic monomer.

Properties of the copolymers obtained by our invention are as follows.

(1) The melting point rarely decreases; at any event, the decrease is not considerable. Sometimes the melting point happens to increase.

(2) The crystallinity rarely decreases, and only to a slight degree, if at all. Sometimes it happens to increase.

(3) Double melting points are rarely observed.

(4) The inherent electric resistivity and the tendency to develope electrostatic charge decrease.

(5) The phase separation and separation of each component by extraction are quite rare.

(6) The dyeability is improved.

(7) Phase transition sometimes occurs at a certain composition, causing the properties of the copolymer to change rapidly at this point from those of a vinyl polymer into those of a polyester (polyether or polyester-ether).

The following examples will serve to illustrate the invention further.

EXAMPLE 1

0.2 mole of styrene was polymerized in 60 ml. of carbon tetrachloride with 0.1 g. of $\alpha,\alpha'$-azobisisobutyronitrile as catalyst in a nitrogen atmosphere in a sealed ampoule at 130° C. for 48 hrs. The content was then poured into 600 ml. of methanol in a high-speed mixer yielding a white powder, which was filtered and dried in vacuo. Yield 40.6%. Intrinsic viscosity 0.0454. Molecular weight 2,580. Melting point 89.5–94.5° C.

5 g. of this polymer was placed in an open glass vessel in a steel bomb, and to this was added an excess amount of liquid ammonia at 20° C. The pressure inside the bomb at 20° C. was 8–10 kg./cm.$^2$. After the reaction, the content was taken out and the unreacted ammonia was evaporated from the polymer, which was washed with methanol and dissolved in 50 ml. of benzene. The solution was poured into 500 ml. of methanol whereby a white powder was obtained which was washed with methanol, filtered and dried in vacuo. Intrinsic viscosity 0.0442. Molecular weight 2,460. Melting point 86–92° C.

2 g. of this polymer and 30 ml. of β-propiolactone were reacted together in a nitrogen atmosphere in a glass ampoule at 50° C. for 20 hrs. After the reaction, the content was dissolved in chloroform to give a homogeneous solution, which was poured into an excess amount of benzene. A small amount of precipitate was observed. The solution was condensed by evaporation at 30–50° C. in a vacuum of 80 ml., and the condensed solution was poured into an excess amount of methanol in a high-speed mixer yielding a precipitate which was filtered and dried in vacuo.

The combined β-propiolactone in the copolymer is 36.9%. Intrinsic viscosity 0.0439. Melting point 88–94° C. This copolymer has almost the same melting point as that of polystyrene, does not show phase separation, contains no homopolymer of β-propiolactone, and the development of a charge by static electricity decreased.

EXAMPLE 2

Styrene was polymerized in the presence of carbon tetrachloride under the conditions as shown in Table 1 in a nitrogen atmosphere in a ampoule at 130° C. for 48 hrs. Then the content was poured into an excess amount of methanol yielding a white powder, which was filtered and dried in vacuo.

5 g. of this polymer was placed in a steel bomb with glass lining inside, and to this was added an excess amount of liquid ammonia until the presure 8–10 kg./cm.$^2$ at 20° C. was reached. The reaction was performed at 15–42° C. for 20 or 48 hrs., with or without stirring, as shown in Table 1. After the reaction, the unreacted liquid ammonia was evaporated and the polymer was washed with methanol. The polymer was dissolved in 50 ml. of benzene, and the solution was filtered. There was only a small amount of precipitate observed. The solution was poured into 500 ml. of methanol in a high-speed mixer whereby a powder was obtained, which was filtered and dried in a vacuum.

2 g. of this polymer and 30 ml. of β-propiolactone were sealed into an ampoule in a nitrogen atmosphere for polymerization at 50° C. for 20 hrs. Then the content was dissolved in chloroform and the solution was poured into an excess amount of benzene. Almost no precipitate was observed. The solution was condensed at 30–50° C. in a vacuum of about 80 ml., and it was poured into 800 ml. of methanol in a high-speed mixer yielding a powder, which was filtered and dried in a vacuo. The results show that stirring of the reaction system is desired on ammonolysis. The infrared spectra of the copolymers showed the absorptions of the ring-opened units of β-propiolactone, and many of the copolymers which are rich in ring-opened units of β-propiolactone showed the X-ray diffraction peaks typical of said units.

Thus the crystallinity of the copolymer increased and the charge by static electricity decreased remarkably, as the number of combined β-propiolactone units increased. The melting points of the copolymers with the combined β-propiolactone units below 32 mole percent are a little higher than that of polystyrene. The copolymers showed no phase separation or double melting points.

EXAMPLE 3

10 g. of methyl methacrylate, 0.3 g. of polymethyl methacrylate of a high molecular weight, 0.001 g. of methacrylic acid, 0.01 g. of $\alpha,\alpha'$-azobisisobutyronitrile and 10 ml. of carbon tetrachloride were sealed in an ampoule in a nitrogen atmosphere for polymerization at 50° C. for 80 hrs. After the polymerization, the content was dissolved in 100 ml. of dimethylsulfoxide yielding a homogeneous solution, which was poured into 1 l. of water in a high-speed mixer whereby a powder was obtained.

2 g. of the powder were placed in a steel bomb with an excess amount of liquid ammonia, and the mixture was agitated at 40–50° C. for 20 hrs. After the reaction, the unreacted ammonia was removed by evaporation from the polymer, which was washed with water and dried in vacuo.

1.5 g. of this polymer and 20 ml. of β-butyrolactone were sealed in an ampoule in a nitrogen atmosphere, and kept at 40° C. for 30 hrs. After the reaction, the content was poured into water in a high-speed mixer, yielding a precipitate, which was filtered and dried in vacuo. The infrared spectra of the copolymer contains the absorptions of the combined β-butyrolactone units. Melting point 130° C. Volume inherent resistivity $10^{12}$ Ω/cm. The copolymer did not show any phase separation or double melting points.

EXAMPLE 4

2 g. of the ω-aminopolymer obtained in Experimental Data No. 2–7 shown in Table 1 and an excess amount of ethylene oxide were placed in a steel bomb and the mixture was heated at 80° C. with agitation for 20 hrs. After the reaction, the unreacted ethylene oxide was removed by evaporation out of the copolymer, which was then dissolved in 20 ml. of chloroform. The solution was poured into 200 ml. of methanol in a high-speed mixer to give a precipitate, which was filtered and dried in vacuo.

The infrared spectra of the copolymer showed that the copolymer contains the combined ethylene oxide units. Melting point 91–100° C. Volume inherent electric resistivity $2 \times 10^{11}$ Ω/cm.

EXAMPLE 5

10.6 g. of acrylonitrile, 0.1 g. of $\alpha,\alpha'$-azobisisobutyronitrile, 30 ml. of carbon tetrachloride, 30 ml. of dimethylsulfoxide and 6.64 g. of carbon tetrabromide were together sealed in an ampoule in a nitrogen atmosphere for polymerization at 50° C. for 50 hrs. After the polymerization, the content was poured into 600 ml. of ethanol in a high-speed mixer yielding a precipitate, which was filtered and dried in vacuo.

3 g. of this polymer was placed in a steel bomb, and to this was added an excess amount of liquid ammonia. The mixture was stirred at 10° C. for 40 hrs. After the reaction, the unreacted ammonia was evaporated out of the polymer, which was washed with ethanol, filtered and dried in vacuo.

2 g. of this polymer and 40 ml. of $\epsilon$-caprolactone were sealed in an ampoule in a nitrogen atmosphere and kept at 50° C. for 10 hrs. After the reaction, the content was dissolved in 40 ml. of dimethylsulfoxide leaving some insoluble polymer which was filtered off. The solution was poured into 400 ml. of chloroform in a high-speed mixer yielding a powder, which was filtered and dried in vacuo.

The infrared spectra of the copolymer showed that $\epsilon$-caprolactone is combined in the copolymer. The volume inherent electric resistivity was $10^{11}$ Ω/cm., which is far smaller than that of polyacrylonitrile.

EXAMPLE 6

Acrylonitrile, carbon tetrachloride, dimethylsulfoxide and $\alpha,\alpha'$-azobisisobutyronitrile, the amount of every substance as shown in Table 2 (from below). The ratios are, for 1 mole of acrylonitrile, the sum of carbon tetrachloride and dimethylsulfoxide is 300 ml., and $\alpha,\alpha'$-azobisisobutyronitrile is 0.5 (were sealed in an ampoule in a nitrogen atmosphere and kept at 50° C. for 20 hrs.). After the polymerization, the content was dissolved in 100 ml. of dimethylsulfoxide, and the solution was poured into 1 l. of water with strong agitation to obtain a precipitate, which was filtered and dried in a vacuum.

This polymer and liquid ammonia were placed in a steel bomb and kept at 20–25° C. for 24 hrs. with agitation. After the reaction, the unreacted liquid ammonia was evaporated out of the polymer, which was dissolved in 200 ml. of N,N-dimethylformamide. The insoluble substance in the solution was filtered off, and the solution was poured into 2 l. of water yielding a precipitate, which was filtered and dried in vacuo.

This polymer and $\beta$-propiolactone were sealed in an ampoule in a nitrogen atmosphere and kept at 30° C. for 20 hrs. After the reaction, the content was washed with chloroform, filtered and dried in vacuo. The results are shown in Table 2.

The amount of the ring-opened cyclic units contained in the polymer can be easily controlled and it varies considerably depending on the purpose and use of the end-blocked copolymer. We found that amounts from 1 mol percent up to 99 mol percent may be useful. For instance, 1% of the cyclic monomer unit combined in the end-blocked copolymer sometimes improves the dyeability of the same to a great extent.

The copolymers formed good films from the solutions in N,N-dimethylformamide. The volume inherent electric resistivities of the copolymers were smaller than that of polyacrylonitrile.

TABLE 1

| Experimental data No. | Telomerization | | | | | Ammonolysis | | | | Addition of β-propiolactone | | | |
|---|---|---|---|---|---|---|---|---|---|---|---|---|---|
| | Styrene (mole) | Carbon tetrachloride (ml.) | Yield (percent) | $(\eta)$ | Melting point (° C.) | Bath temperature (° C.) | Reaction time (hrs.) | Stirring | $[\eta]$ | Melting point (° C.) | Combined propiolactone in copolymer (mole percent) | M.P. of copolymer/M.P. of aminopolymer | Relative content of β-propiolactone unit in copolymer (percent) | IR intensity DC=O/DCH |
| 2-1 | 0.200 | 60 | 42.0 | 0.0558 | 84.5~88.0 | 40~42 | 20 | No | | 92.5-100.5 | 0 | | 0 | 0 |
| 2-2 | 0.262 | 120 | 19.6 | 0.0510 | 87.5~96.0 | 40~42 | 20 | Yes | 0.0630 | 97.5-104.0 | 33.2 | 0.980 | 2.25 | 1.11 |
| 2-3 | 0.522 | 90 | 42.3 | 0.0570 | 88.0~106 | 15~20 | 48 | No | | | 30.6 | 1.06 | 4.45 | 2.37 |
| 2-4 | 0.522 | 90 | 42.3 | 0.0570 | 88.0~106 | 15~20 | 20 | Yes | 0.0763 | 100.5~115 | 0 | | 0 | 0 |
| 2-5 | 0.522 | 60 | 58.5 | 0.0309 | 95.0~102 | 15~20 | 20 | No | | | 18.8 | | 1.30 | 0.385 |
| 2-6 | 0.783 | 60 | 58.5 | 0.0309 | 95.0~102 | 15~20 | 20 | Yes | 0.0945 | 107~115 | 0 | 1.03 | 0 | |
| 2-7 | 0.783 | 30 | 63.4 | 0.131 | 102~109 | 40~42 | 20 | Yes | 0.0495 | 81~91 | 37.1 | 0.798 | 5.15 | 3.650 |

TABLE 2

| Experimental data No. | ω-Chloropolymer [1] | | | | ω-Aminopolymer [4] | | Ene-block copolymer [5] | | |
|---|---|---|---|---|---|---|---|---|---|
| | DMSO (ml.) | CCl₄ (ml.) | M.P.[3] (° C.) | $\eta_{nh}$[2] | M.P.[3] (° C.) | $\eta_{nh}$[2] | Combined [6] BPL (percent) | M.P.[3] (° C.) | $\eta_{nh}$[2] |
| 6–1 | 81 | 9 | 267–273 | 2.15 | 238–246 | 2.53 | 20.3 | 191–199 | 2.15 |
| 6–2 | 63 | 27 | 245–261 | 1.84 | 213–223 | 1.85 | 10.6 | 179–186 | 1.77 |
| 6–3 | 45 | 45 | 235–243 | 1.98 | 209–224 | 2.08 | 37.6 | 170–178 | 1.72 |
| 6–4 | 27 | 63 | 228–234 | 2.12 | 214–229 | 2.19 | 17.9 | 179–189 | 2.17 |
| 6–5 | 9 | 81 | 219–233 | 2.34 | 208–219 | 2.37 | 21.9 | 180–198 | 2.35 |

[1] Acrylonitrile 15.9 g., α,α'-azobisisobutyronitrile 0.15 g., bath temperature 30° C., reaction time 20 hrs.
[2] At 0.5 g./100 ml. in DMF.
[3] Crystalline melting point through a pair of crossed nicols.
[4] ω-Chloropolyacrylonitrile 9 g., liquid ammonia 9 atm., bath temperature 20–25° C., reaction time 24 hrs.
[5] ω-Aminopolyacrylonitrile 2.5 g., β-propiolactone 70 ml., bath temperature 30° C., reaction time 20 hrs.
[6] From elementary analysis.

What is claimed is:

1. End-blocked copolymers consisting of molecular chains of vinyl polymers of vinyl monomers which can be polymerized into ω-halopolymers in the presence of telogens connected at least at one chain terminal to the chain terminal of a ring-opened polymer unit of one or more of the cyclic compounds of the group of β-lactones, ε-caprolactone and ethylene oxide, the connection between the vinyl chain and the chain of the ring-opened polymer of the cyclic compound being an amide or nitrogen linkage.

2. End-blocked copolymers according to claim 1, wherein the vinyl polymer is a polymer of a monomer selected from the group consisting of styrene, acrylonitrile, methacrylonitrile, butadiene, isoprene, ethylene, propylene, methylacrylate, methyl methacrylate, acrylamide, methacrylamide, vinyl acetate and vinyl toluene.

3. End-blocked copolymers, according to claim 1, wherein the cyclic compound is β-propiolactone contained in the polymer in the amount of from about 1 to about 99 mole percent.

4. End-blocked copolymers according to claim 2 expressed by the formula

P—NH—X$_n$ wherein P is one of the vinyl units as mentioned, X stands for a ring-opened unit of a β-lactone, ε-caprolactone, and ethylene oxide and $n \geq 1$.

5. End-blocked copolymers according to claim 2, expressed by the formula

wherein P₁ and P₂ are vinyl units as mentioned and X stands for a ring-opened unit of a β-lactone, ε-caprolactone, and ethylene oxide, and $n \geq 1$.

6. End-blocked copolymers according to claim 2, expressed by the formula

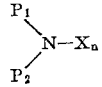

wherein P is one of the vinyl units as mentioned, X stands for a ring-opened unit of a β-lactone, ε-caprolactone and ethylene oxide, Rₐ is a radical of a primary amine, and $n \geq 1$.

7. End-blocked copolymers according to claim 2, expressed by the formula

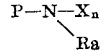

wherein P is one of the vinyl units mentioned, X stands for ethylene oxide and m and n are both $\geq 1$.

8. End-blocked copolymers according to claim 2, expressed by the formula

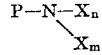

wherein P₁, P₂ and P₃ are vinyl units as mentioned, X stands for a ring-opened unit of a β-lactone, and $n \geq 1$.

9. End-blocked copolymers according to claim 2, expressed by the formula

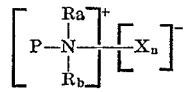

wherein P is one of the vinyl units as mentioned, X stands for a ring-opened unit of a β-lactone, Ra and Rb are both radicals of a secondary amine, and $n \geq 1$.

10. End-blocked copolymers according to claim 2, expressed by the formula

P—NH—[CORO]$_m$[COR'O]$_n$H wherein P is one of the vinyl units as mentioned, R and R' are different radicals of the mentioned lactones, m and n are $\geq 1$.

11. A method of preparing end-blocked copolymers consisting of molecular chains of vinyl polymers connected at least at one chain terminal to the chain terminal of a ring-opened unit of one or more of the cyclic compounds of the group of β-lactones, ε-caprolactone and ethylene oxide, the connection between the vinyl chain and the chain of the cyclic compound being by way of amide or nitrogen which comprises the steps of
  (a) subjecting vinyl monomer to telomerization in the presence of a halogen compound, to obtain ω-halopolymers;
  (b) subjecting said ω-halopolymers to ammonylses or aminolyses in the presence of ammonia or organic primary or secondary amines, to obtain ω-aminopolymers; and
  (c) adding one or more of the cyclic monomers, β-lactones, ε-caprolactone and ethylene oxide to said ω-aminopolymers, to yield said end-blocked copolymers.

12. The process according to claim 11, wherein the degree of polymerization is regulated in the first step by the chain transfer constant of the telogen chosen.

13. The process according to claim 11, wherein an excess amount of ammonia is used in the second step in order to maintain the properties of the original polymer of the vinyl unit unchanged in the resulting copolymer.

References Cited

UNITED STATES PATENTS

| 2,921,920 | 1/1960 | Smith et al. | 260—29.6 |
| 3,050,511 | 8/1962 | Szwarc | 260—93.5 |
| 3,406,154 | 10/1968 | Wilson | 260—78.3 |
| 3,424,820 | 1/1969 | Magat et al. | 260—857 |

WILLIAM H. SHORT, Primary Examiner

E. A. NIELSEN, Assistant Examiner

U.S. Cl. X.R.

260—80 M, 80 P, 88.3 A, 88.7 R, 89.1, 89.5 R, 89.7 R, 93.5 R, 93.7, 94.2 R, 94.9 R